United States Patent
Fegley et al.

(10) Patent No.: US 10,125,837 B1
(45) Date of Patent: Nov. 13, 2018

(54) CYLINDRICALLY ROLLED ENERGY ABSORBER FOR USE WITH A SELF-RETRACTING LIFELINE

(71) Applicant: Honeywell International Inc., Morris Plains, NJ (US)

(72) Inventors: Michael Fegley, Maple Grove, MN (US); Andrew W. Sadley, Franklin, PA (US); Ross Balquist, Slippery Rock, PA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/666,072

(22) Filed: Aug. 1, 2017

(51) Int. Cl.
    *A62B 35/04* (2006.01)
    *F16F 7/00* (2006.01)
    *E04G 21/32* (2006.01)

(52) U.S. Cl.
    CPC ............. *F16F 7/006* (2013.01); *A62B 35/04* (2013.01); *E04G 21/3204* (2013.01); *F16F 2234/02* (2013.01); *F16F 2236/06* (2013.01)

(58) Field of Classification Search
    CPC .......... F16F 7/128; F16F 7/006; A62B 35/04; E04G 21/3204
    USPC ...................................... 188/371, 376; 182/3
    See application file for complete search history.

(56) References Cited

U.S. PATENT DOCUMENTS

| | | | | |
|---|---|---|---|---|
| 3,444,957 A | * | 5/1969 | Ervin, Jr. ............... | A62B 35/04 182/3 |
| 3,804,698 A | * | 4/1974 | Kinloch .................. | B60R 22/28 156/702 |
| 3,937,407 A | * | 2/1976 | Matsuo .................. | A62B 35/04 188/376 |
| 4,446,944 A | * | 5/1984 | Forrest .................. | A62B 35/04 182/3 |

(Continued)

FOREIGN PATENT DOCUMENTS

| | | |
|---|---|---|
| JP | 4227494 B2 | 12/2008 |
| JP | 4227494 B2 | 2/2009 |

OTHER PUBLICATIONS

EZ-Stop® Shock Absorber (http://www.capitalsafety.com/enus/Pages/ProductDetails.aspx?prodId=851).

(Continued)

*Primary Examiner* — Thomas W Irvin
(74) *Attorney, Agent, or Firm* — Wood, Phillips, Katz, Clark & Mortimer

(57) ABSTRACT

A cylindrically rolled energy absorber (10) is provided to absorb the energy of a user's fall from a worksite and includes a strip (18) of bi-layered webbing defining two parallel rolls (22, 24) of webbing centered on a central axis (40), with the width of the strip (18) in each roll (22, 24) extending parallel to the central axis (40). The strip (18) includes two layers (42, 44) of webbing joined together over the length of the strip by tear-apart connections (46). Each end (36, 38) of the strip (18) has end portions (54, 56) of each the layers (42, 44) that are separated from each other.

(Continued)

A first connector loop (26) extends from the roll (22) and is fixed to a first end portion (54, 56) from end (36) of the strip and to a second end portion (54, 56) from the other end (38) of the strip (18). A second connector loop (28) extends from the other roll (24) and is fixed to a third end portion (54, 56) from the end (36) of the strip (18) and to a fourth end portion (54, 56) from the other end (38) of the strip (18).

20 Claims, 7 Drawing Sheets

(56) References Cited

U.S. PATENT DOCUMENTS

| | | | | |
|---|---|---|---|---|
| 4,538,702 | A * | 9/1985 | Wolner | A62B 35/04 182/230 |
| 5,174,410 | A * | 12/1992 | Casebolt | A62B 35/04 182/3 |
| 5,598,900 | A * | 2/1997 | O'Rourke | A62B 35/0056 182/18 |
| 6,533,066 | B1 * | 3/2003 | O'Dell | A62B 35/04 182/3 |
| 8,061,481 | B2 * | 11/2011 | Wolner | A62B 35/0006 182/3 |
| 8,701,826 | B2 * | 4/2014 | Smith | F16F 7/006 182/3 |
| 2008/0060872 | A1 * | 3/2008 | Wise | A62B 35/0075 182/3 |
| 2012/0132481 | A1 | 5/2012 | Jones | |
| 2013/0292219 | A1 | 11/2013 | Perner | |
| 2014/0224580 | A1 * | 8/2014 | Casebolt | A62B 35/0025 182/3 |

OTHER PUBLICATIONS

EZ-Stop™ Shock Absorber, Capital Safety, 2 web pages, dated Feb. 13, 2017.

\* cited by examiner

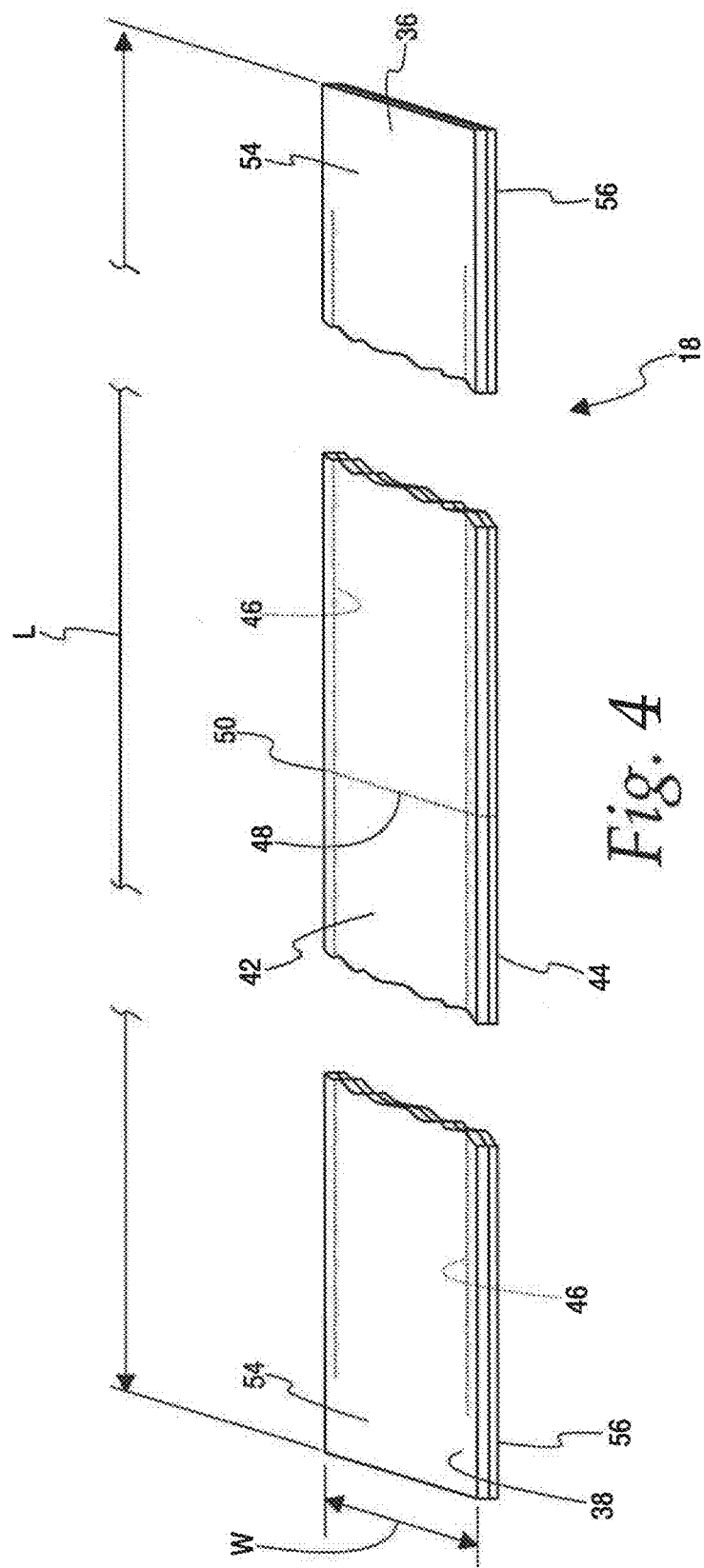

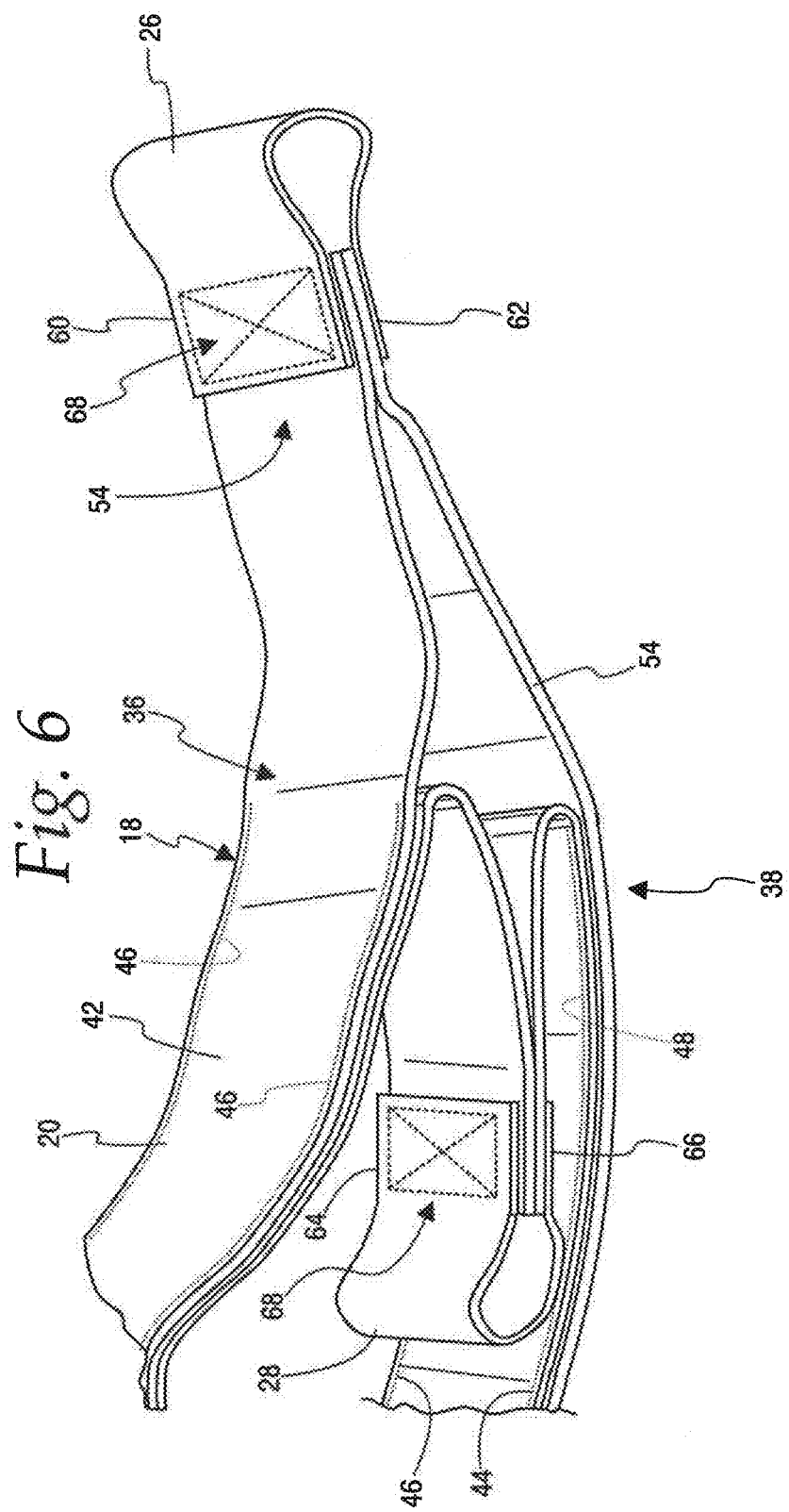

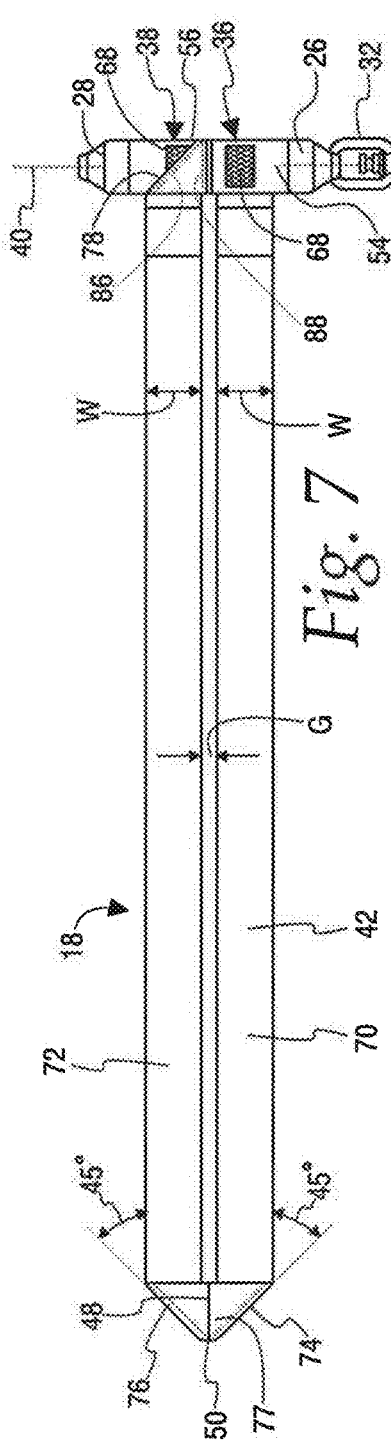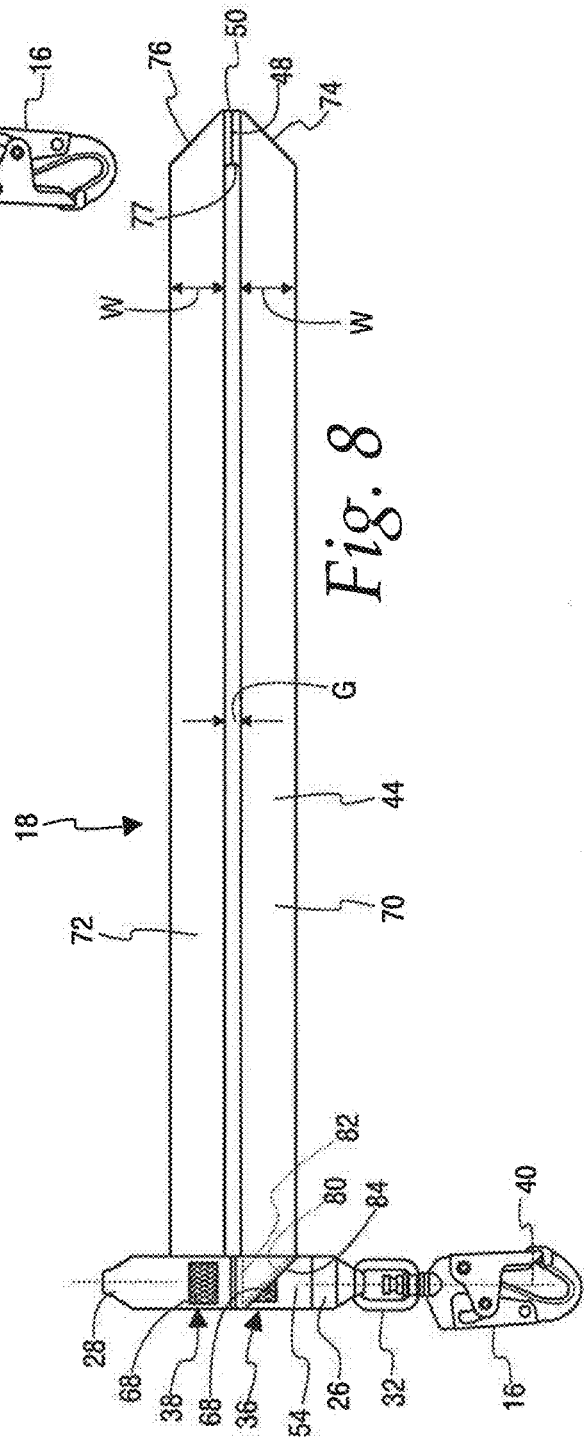

US 10,125,837 B1

CYLINDRICALLY ROLLED ENERGY ABSORBER FOR USE WITH A SELF-RETRACTING LIFELINE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure is related to fall protection, and more particularly, to energy absorbers for use with fall arrest devices such as self-retracting lifelines (SRL's) and lanyards,

BACKGROUND

The use of self-retracting lifelines and energy absorbers is well-known in the fall protection industry. Recently, there has been a desire to combine an energy absorption device to the user side of the SRL's in order to protect the user in the event of a fall. While several existing energy absorber devices are known and suitable for such use, there is always room for improvement. For example, existing energy absorber devices for use with SRL's have proven to be relatively large, heavy and bulky, and can inhibit movement and create a nuisance to the user of the SRL/energy absorber device combination.

Often, these energy absorber devices are in the form of a length of webbing that have been folded to overlap and which absorbs energy as it unfolds while breaking connections between adjacent layers of the webbing. Such absorber devices have folds that are perpendicular to the length of the webbing which shortens the original length but still results in a lengthening of the overall SRL/energy absorber combination.

SUMMARY

In accordance with one feature of the invention, a cylindrically rolled energy absorber is provided for use with fall protection equipment to absorb the energy of a user's fall from a worksite. The energy absorber includes a strip of bi-layered webbing defining two parallel rolls of webbing centered on a central axis. The strip has a length extending between opposite ends of the strip and a width extending perpendicular to the length, with the width of the strip in each roll extending parallel to the central axis. The strip includes two layers of webbing joined together over the length of the strip by tear-apart connections. Each end of the strip has end portions of each layer that are separated from each other. A first connector loop extends from one of the two rolls and is fixed to a first one of the end portions from one end of the strip and to a second one of the end portions from the other end of the strip. A second connector loop extends from the other one of the rolls and is fixed to a third one of the end portions from the one end of the strip and to a fourth one of the end portions from the other end of the strip.

As one feature, the first connector loop is centered in the one of the two rolls and comprises a length of webbing having an end fixed to the first end portion and another end fixed to the second end portion. The second connector loop is centered in the other of the two rolls and comprising another length of webbing having an end fixed to the third end portion and another end fixed to the fourth end portion.

In one feature, the energy absorber further includes an inseparable connection joining the two layers together at a predetermined location along the length of the strip, with the first and second end portions being part of one of the two layers of webbing and the third and fourth end portions being part of the other one of the two layers of webbing.

According to one feature, the strip has two folds in a portion of the strip that extends from one of the rolls to the other of the rolls.

As one feature, the energy absorber further includes an inseparable connection joining the two layers together at a location between the two folds. In a further feature, the inseparable connection extends perpendicular to the length over the full width of the strip.

According to one feature, the two folds are along angles relative to the length that are complimentary to each other.

As one feature, the two folds are along 45° angles relative to the length of the strip.

In one feature, each of the end portions has a fold adjacent the corresponding one of the first and second connector loops. According to a further feature, each of the folds in the end portions are along a 45°. angle relative to the length of the strip. As yet a further feature, two of the end portions have an additional fold adjacent the corresponding one of the first and second connector loops. In a further feature, each of the additional folds are along a line parallel to the length of the strip.

According to one feature, the tear apart connections are woven connections.

As one feature, the tear apart connections are stitched connections.

In one feature, the energy absorber further includes an inseparable connection joining the two layers together at a predetermined location along the length of the strip, with the predetermined location being in a portion of the strip extending between the two rolls. According to a further feature, the inseparable connection extends perpendicular to the length over the full width of the strip.

As one feature, the connector loops are fixed to the end portions by stitching.

In one feature, a swivel hoop extends through one of the connector loops to fix a snap hook to the strip.

According to one feature, the energy absorber further includes an adhesive tape joining the two rolls together, the adhesive tape extending between the two rolls and surrounding portions of the two rolls that are adjacent to each other.

As one feature, the energy absorber further includes a tube-shaped, flexible cover surrounds the two rolls. In a further feature, the tube-shaped cover has a pair of oppositely facing, cinched end openings, with one of the connector loops extending outwardly from one of the end openings and the other one of the connector loops extending outwardly from the other one of the end openings.

According to one feature, a cylindrically rolled energy absorber is provided for use with fall protection equipment to absorb the energy of a user's fall from a worksite. The energy absorber includes a strip of bi-layered webbing defining two parallel rolls of webbing centered on a central axis. The strip has a length extending between opposite ends of the strip and a width extending parallel to the length, with the width of the strip in each roll extending parallel to the central axis. The strip includes two layers of webbing joined together over the length of the strip by tear-apart connections. Each end of the strip has end portions of each layer that are separated from each other. A pair of connector loops extend in opposite directions from the rolls, with one of the loops extending from one of the rolls and the other loop extending from the other one of the rolls. Each of the loops is fixed to a different pair of the end portions, with each loop attached to an end portion from one end of the strip and an end portion from the other end of the strip.

Other features and advantages will become apparent from a review of the entire specification, including the appended claims and drawings.

BRIEF DESCRIPTION OF THE DRAWINGS

FIG. 4 is a view of the strip of webbing shown in FIG. 2, with the webbing shown in an extended state prior to being rolled into the condition shown in FIG. 2, and with portions of the length of the webbing broken away for purposes of illustration;

FIG. 6 is a view similar to FIG. 5, but showing connector loops fixed to the strip;

FIG. 7 is a top plan view showing selected components of the energy absorber device in an unrolled condition during assembly of the energy absorber;

FIG. 8 is a bottom plan view showing the selected components of FIG. 7; and

DETAILED DESCRIPTION

Figure 1:
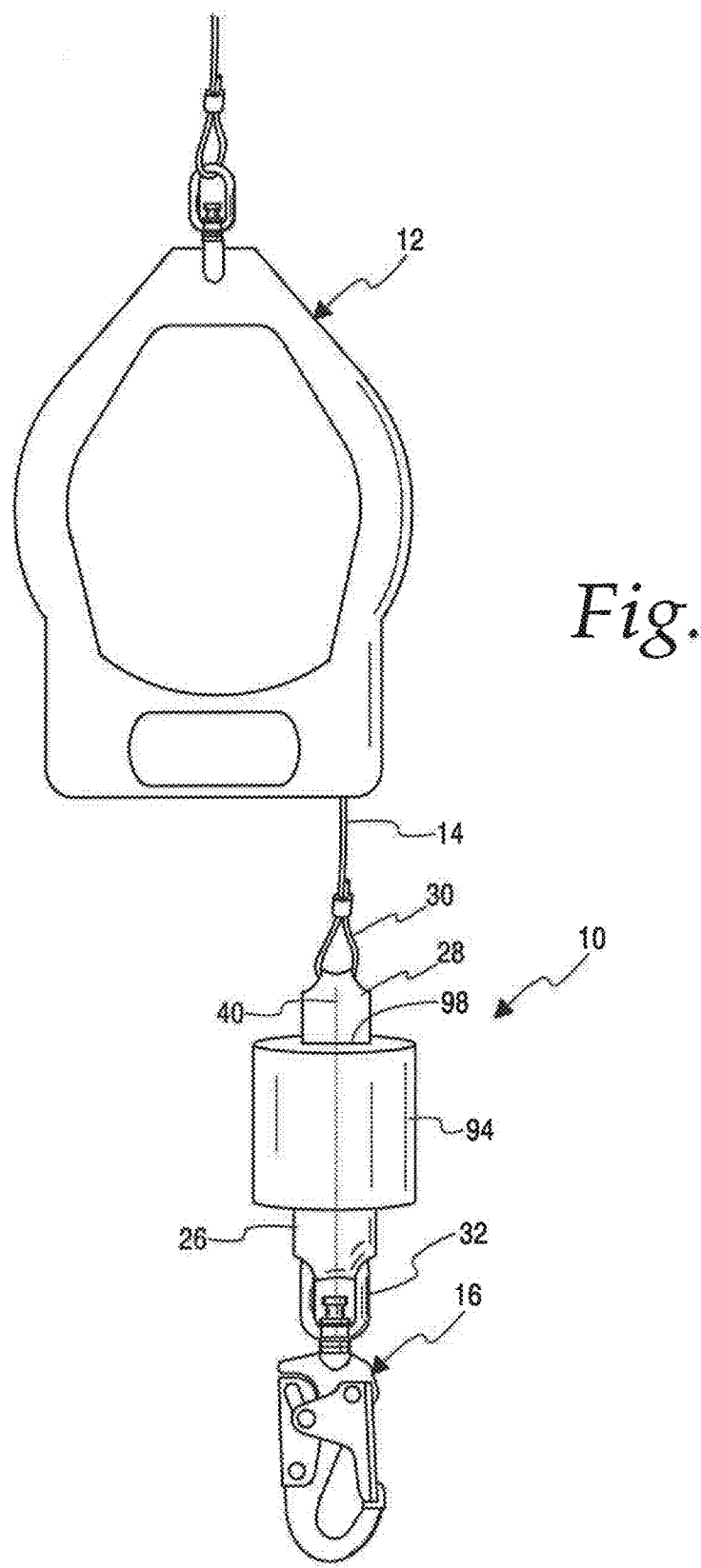
FIG. 1 is a somewhat diagrammatic representation of a self-retracting lifeline and an energy absorber device according to this disclosure.

With reference to FIG. 1, a cylindrically rolled energy absorber 10 is shown for use with fall protection equipment, such as a self-retracting lifeline (SRL) 12, to absorb the energy of a user's fall from a worksite. In the illustrated embodiment, the energy absorber 10 has a first end attached to the lifeline 14 extending from the SRL 12 and an opposite end that includes a snap hook 16 for attachment to an anchor point or to a harness or other piece of personal protective equipment worn by a user. It should be appreciated that while the energy absorber 10 is shown in FIG. 1 for use with the SRL 12, the energy absorber 10 can be utilized with other fall protection equipment, such as, for example, a fall arrest lanyard. It should also be appreciated that the energy absorber 10 can be utilized with any form of self-retracting lifeline and/or fall arrest lanyard and that the details of the SRL 12 shown in FIG. 1 are not critical to an understanding of the energy absorber 10 disclosed herein and, accordingly, further details of the SRL 12 will not be discussed herein.

Figure 2:
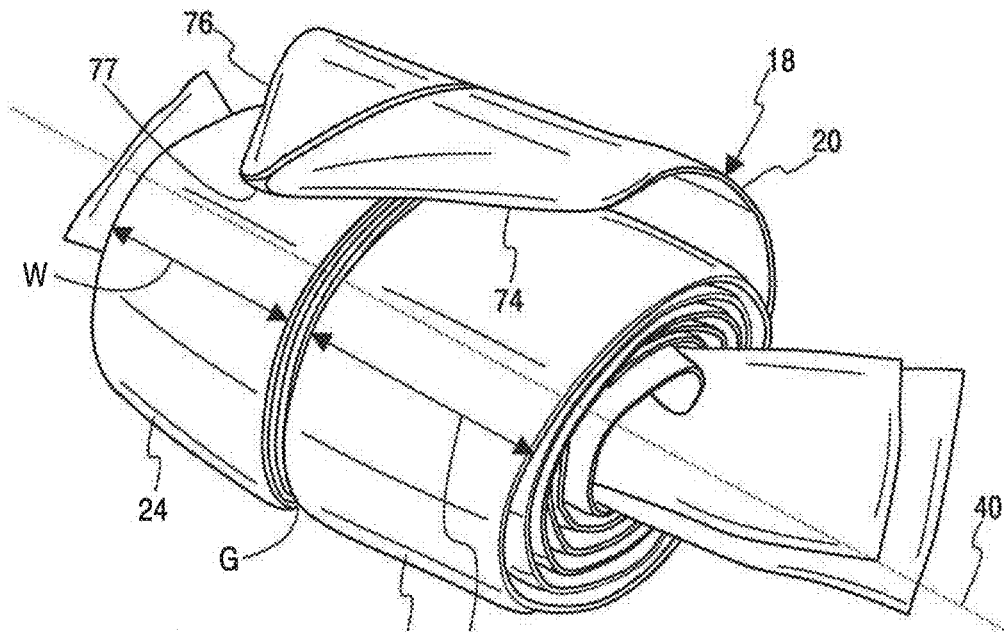
FIG. 2 is a perspective view of a rolled, two-layered, strip of webbing utilized in the energy absorber device to absorb energy according to this disclosure.
Figure 3:
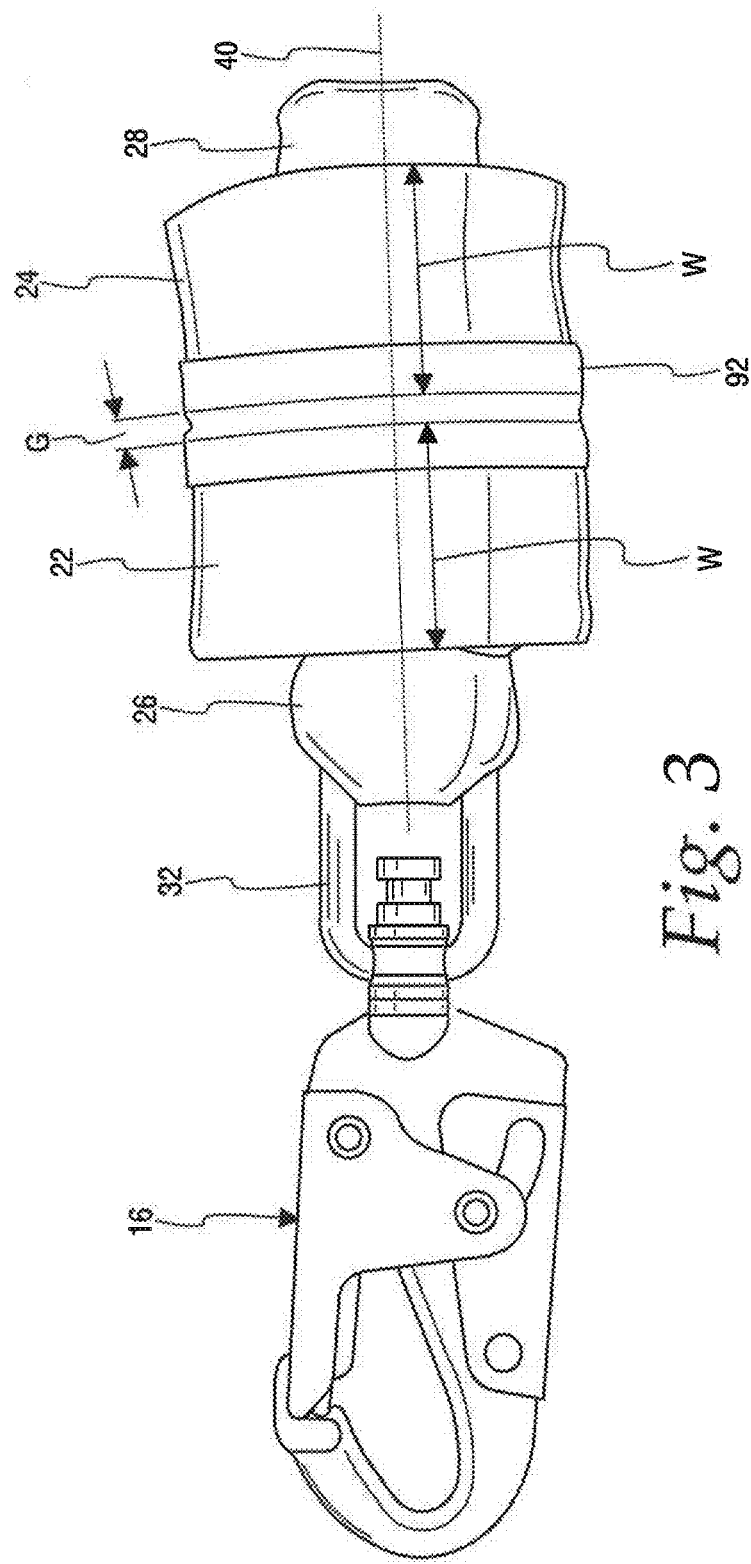
FIG. 3 is an enlarged view of selected components of the energy absorber device of FIG. 1, with an outer casing of the energy absorber device removed for purposes of illustration.

As best seen in FIG. 2, the energy absorber 10 includes a strap/strip 18 of bi-layered webbing 20 that defines two parallel rolls 22 and 24. As best seen in FIG. 3, the energy absorber 10 further includes a pair of connector loops 26 and 28, with the loop 26 extending in a first direction from the roll 22 and the connector loop 28 extending in an opposite direction from the roll 24. As seen in FIG. 1, in the illustrated embodiment, the lifeline 14 has a loop 30 that extends through the loop 28 to fix the energy absorber 10 to the lifeline 14, and the snap hook 16 includes a swivel hoop 32 extending through the connector loop 26 to fix the snap hook 16 to the remainder of the energy absorber 10.

As best seen in FIG. 4, the strip 18 has a length L extending between opposite ends 36 and 38 of the strip 18, and a width W extending perpendicular to the length L. As best seen in FIGS. 2 and 3, the rolls 22 and 24 are centered on a central axis 40 with the width W of the strip 18 in each roll 22,24 extending parallel to the central axis 40. As best seen in FIG. 4, the strip 18 has two layers of webbing 42 and 44 that are joined together over the length L of the strip 18 by tear-apart connections, illustrated diagrammatically by the dashed lines 46. In the illustrated embodiment, the tear-apart connections 46 are provided in the form of woven connections, but it should be understood that any suitable tear-apart connection can be utilized, including, for example, stitching that can be torn apart or otherwise broken or a bond that can be severed or otherwise broken. The tear-apart connections 46 function to absorb the energy of a fall when a user wearing the device 10 falls from a worksite. In this regard, the energy absorber 10 is configured such that the layers 42 and 44 are separated from each other in response to a user falling from a worksite. Thus, as used herein the term "tear-apart connections" is intended to include any type of connection between the two webbing layers 42 and 44 that is broken, severed, torn, or otherwise separated to absorb energy in response to the energy absorber 10 being subjected to a user fall.

As best seen in FIG. 4 in the illustrated embodiment, the strip 18 also includes an inseparable connection 48 joining the two layers 42 and 44 together at a predetermined location 50 along the length L of the strip 18. In the illustrated embodiment, the location 50 is centered between the ends 36 and 38 and extends over the full width W of the strip 18. The inseparable connection 46 serves to maintain a connection between the layers 42 and 44 to prevent the layers 42 and 44 from completely separating after the energy absorber 10 has absorbed the energy of a fall, and accordingly should be able to withstand a predetermined maximum force, such as for example, a predetermined maximum shock load of 3,000 pounds. Thus, as used herein, the term "inseparable connection" is intended to indicate a connection that will withstand a predetermined maximum shock load resulting from the fall of a user, and is not intended to indicate a connection that cannot be separated under loads that exceed this predetermined maximum shock load. The inseparable connection 48 can be of any suitable form, including, for example, a bonded connection, a woven connection, or a stitched connection.

Figure 5:
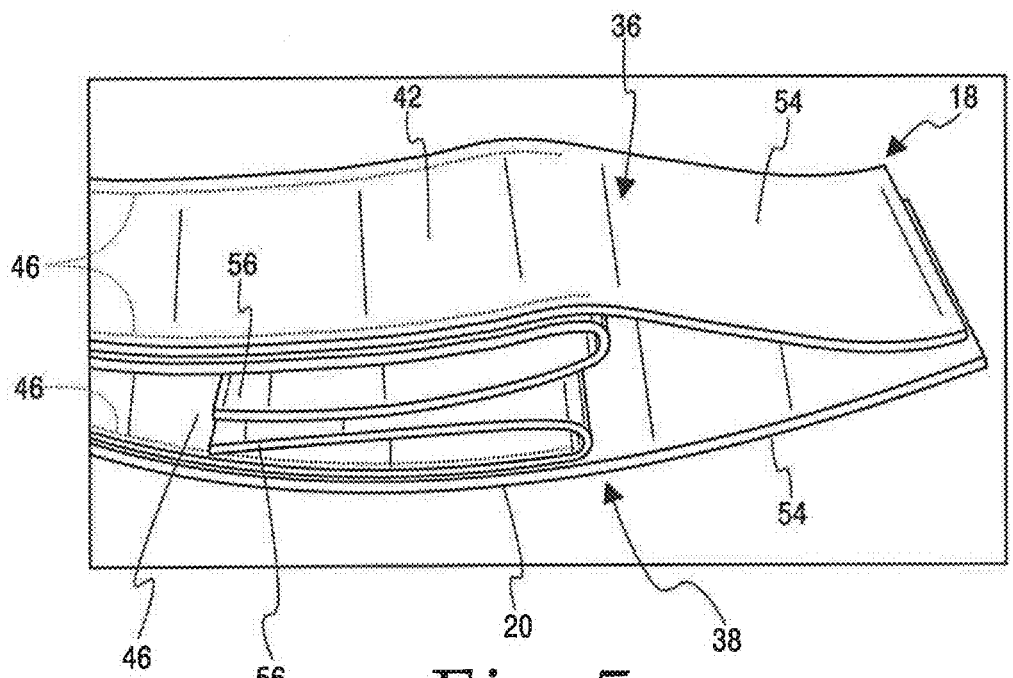
FIG. 5 is an enlarged view of the strip of webbing of FIGS. 2 and 4, with the strip having been folded over on itself to better show end portions of the strip.

FIG. 5 shows the strip 18 folded over on itself for purposes of illustration in order to show that each end 36 and 38 of the strip 18 has an end portion 54 of the layer 42 and an end portion 56 of the layer 44 that are separated from each other over a limited distance adjacent each end 36 and 38. As best seen in FIG. 6, in the illustrated embodiment, each of the connector loops 26 and 28 are formed from a strip of webbing, with the connector loop 26 having an end portion 60 fixed to the end portion 54 of the end 36 of the strip 18 and another end portion 62 fixed to the end portion 54 from the other end 38 of the strip 18. Similarly, the connector loop 28 has an end portion 64 fixed to the end portion 56 of the end 36 of the strip 18 and another end portion 66 fixed to the end portion 56 of the other end 38 of the strip 18. Each of the end portions 60-66 can be fixed to the corresponding end portion 54, 56 using any suitable means, many of which are known, including, for example, a stitched connection 68 formed of suitably strong threads. The connection 68 should be able to withstand the maximum shock load anticipated for the energy absorber 10.

As best seen in FIG. 7, in order to define the two parallel rolls 22 and 24 of webbing, two parallel runs 70 and 72 are first created by forming two folds 74 and 76 in a portion 77 of the strip 18 extending on either side of the halfway point 50 (and the inseparable connection 48) between the ends 36 and 38. After they are created, the parallel runs 70 and 72 have a gap G separating the runs 70 and 72 and can be rolled up to form the two parallel rolls 22 and 24, with the run 70 forming the roll 22, the run 72 forming the roll 24, and the portion 77 extending between the rolls 22 and 24. In order to make the runs 70 and 72 of the strip 18 parallel, the folds 74 and 76 are along angles relative to the length L that are complementary to each other and, in the illustrated embodiment, are at 45° angles relative to the length L, but could be other complementary angles, such as, for example, 30°/60° or 50°/40°.

In the illustrated embodiment, each of the connector loops 26 and 28 extend perpendicular to the length L of the strip 18 in the runs 70 and 72 and parallel to the axis 40. As best seen in FIGS. 7 and 8, to achieve this, one of the end portion 54 of the end 38 has a single fold 78 (shown in FIG. 7) that is at a 45° angle relative to the length L of the strip 18 and the other end portion 54 of the end 36 has two folds 80 and 82 (shown in phantom in FIG. 8), with the fold 80 being a 45° angle fold and the fold 82 being parallel to the length L of the strip 18. Similarly, the end portion 56 of the end 36 has a single fold 84 (shown in FIG. 8) that is at a 45° angle relative to the length L of the strip 18 and the other of the end portion 56 of the end 38 has two folds 86 and 88 (shown in phantom in FIG. 7), with the fold 86 being a 45° angle fold and the fold 88 being parallel to the length L. In order to form the rolls 22 and 24 of the illustrated embodiment of the energy absorber 10, the parallel runs 70 and 72 are wrapped around the end portions 54 and 56 to form a spiral wrapping of each run 74 and 76 that is centered on the axis 40, with the gap G separating the two parallel rolls 22 and 24.

Figure 9:
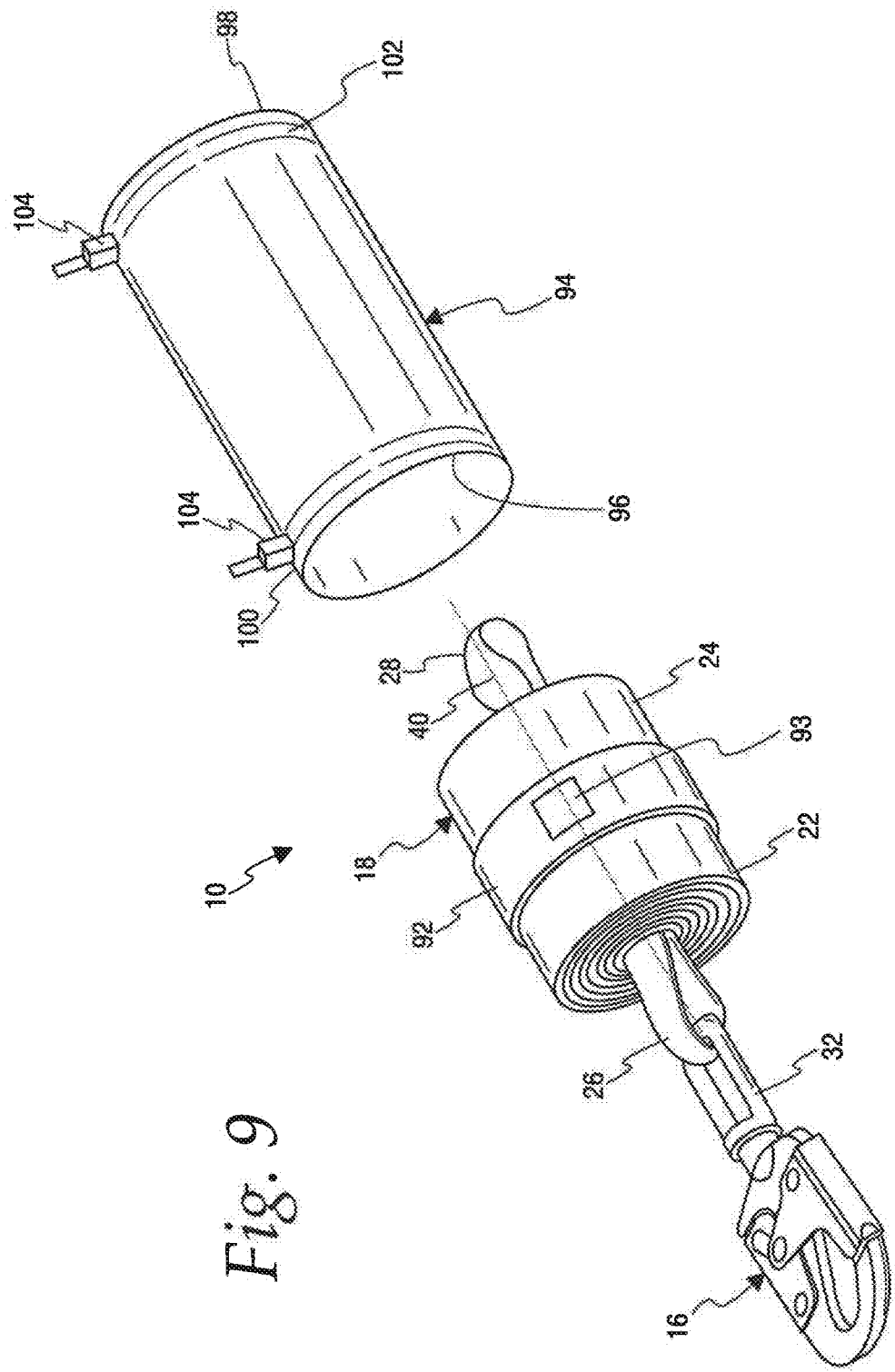
FIG. 9 is an exploded, perspective view of the energy absorber of FIGS. 1-10.

As best seen in FIGS. 3 and 9, for ease of assembly an adhesive tape 92 is applied to the outermost surfaces of the strip 18 on both of the rolls 22 and 24 adjacent the gap G so that the tape 92 wraps completely around the rolls 22 and 24, including over the portion 77 so as to hold the rolls 22 and 24 together for handling and/or assembly. In the illustrated embodiment, the tape 92 can include identifiers, either printed, or in the form of an RFID chip 93, or both. After the tape 92 is applied, the rolls 22 and 24 are slipped into a tube-shaped cover 94, which is formed from a flexible material, such as a flexible fabric of any suitable material, such as nylon or Kevlar. The tube-shaped cover 94 includes a pair of oppositely facing end openings 96 and 98, with each end opening 96 and 98 surrounded by a cinchable seam 100 and 102, respectively, with each seam 100 and 102 having a cinchable member, such as a cable tie 104 slidably received within the seam 100, 102. The openings 96 and 98 are cinched down against the connector loops 26 and 28, respectively, using the cable ties 104 so that only the connector loops 26 and 28 extend outwardly from the cover 94, which allows the cover 94 to protect the strip 18 from environmental hazards.

It should be appreciated that while specific embodiments of the energy absorber 10 have been shown herein, the energy absorber 10 according to this disclosure is not limited to the specific illustrated embodiments. For example, while the inseparable connection 48 has been shown at a location 50 that is centered between the ends 38 and 40, and between the rolls 22 and 24, other locations along the length of the strip 18 may be desirable. As a further example, while the illustrated embodiments include the inseparable connection 48, in some applications the inseparable connection 48 may not be desirable, such as, for example, when the connector loop 26 if connected to the end portion 54 from the end 36 of the strip 18 and to the end portion 56 from the other end 38 of the strip 18, and the connector loop 28 is connected to the end portion 54 from the end 38 of the strip 18 and to the end portion 56 from the other end 36 of the strip 18. As yet a further example, while the connector loop 26 is shown as connected to the snap hook 16, in some embodiments, the connector loop 26 may be connected to a different type or class of PPE. As a further example, while the illustrated embodiment includes the adhesive tape 92 joining the two rolls 22 and 24 together for handling and/or assemble, in some applications it may be desirable for the two rolls 22 and 24 to be joined together by other suitable means for handling and/or assemble, or for the two rolls to simply be assembled into the cover 94 without any additional structure joining the two rolls 22 and 24 other than the portion 77 of the strip 18 extending between the two rolls 22 and 24. As an even further example, while a specific form has been shown for the cover 94 has been illustrated, in some applications it may be desirable for other forms or types of covers to be used, or for the energy absorber 10 to be used without any type of cover. As another example, while the connector loops 26 and 28 are shown as being formed from webbing, in some applications it may be desirable for other types of material to be used or for other types or forms of connector loops to be utilized in the energy absorber 10. As a further example, while the illustrated embodiment utilizes the folds 80-88 in order to achieve the desired orientation of the connector loops 26 and 28 relative to the parallel rolls 22 and 24, in some applications it may be desirable to utilize other combinations of folds than those illustrated. Similarly, while specific folds 74 and 76 have been illustrated to obtain the desired orientation of the runs 70 and 72, it should be understood that other folds may be desirable to obtain the desired orientation of the parallel runs 70 and 72. Accordingly, it should be understood that no limitation to a specific illustrated feature is intended unless expressly recited in one of the appended claims.

It should be appreciated that the cylindrically rolled energy absorber 10 disclosed herein allows for the energy absorber 10 to be packaged in a way that makes the entire SRL/energy absorber combination shorter, lighter, and less likely to interfere with the user during normal usage in comparison to existing SRL/energy absorber combinations. This is advantageous, because the end users are always looking for the smallest, lightest product for use in the field.

The invention claimed is:

1. A cylindrically rolled energy absorber for use with fall protection equipment to absorb the energy of a user's fall from a worksite, the energy absorber comprising:
    a strip of bi-layered webbing defining two parallel rolls of webbing centered on a central axis, the rolls being spaced from each other along the central axis, the strip having a length extending between opposite ends of the strip and a width extending perpendicular to the length, the width of the strip in each roll extending parallel to the central axis, the strip comprising two layers of webbing joined together over the length of the strip by tear-apart connections, each end of the strip having end portions of each the two layers that are separated from each other;

a first connector loop extending from one of the two rolls and fixed to a first one of the end portions from one end of the strip and to a second one of the end portions from the other end of the strip; and a second connector loop extending from the other one of the rolls and fixed to a third one of the end portions from the one end of the strip and to a fourth one of the end portions from the other end of the strip.

2. The energy absorber of claim 1 wherein:
the first connector loop is centered in the one of the two rolls and comprises a length of webbing having an end fixed to the first end portion and another end fixed to the second end portion; and
the second connector loop is centered in the other of the two rolls comprises another length of webbing having an end fixed to the third end portion and another end fixed to the fourth end portion.

3. The energy absorber of claim 1 further comprising an inseparable connection joining the two layers together at a predetermined location along the length of the strip, and wherein:
the first and second end portions are part of one of the two layers of webbing; and
the third and fourth end portions are part of the other one of the two layers of webbing.

4. The energy absorber of claim 1 wherein the strip has two folds in a portion of the strip that extends from one of the rolls to the other of the rolls.

5. The energy absorber of claim 4 further comprising an inseparable connection joining the two layers together at a location between the two folds.

6. The energy absorber of claim 5 wherein the inseparable connection extends perpendicular to the length over the full width of the strip.

7. The energy absorber of claim 4 wherein the two folds are along angles relative to the length that are complimentary to each other.

8. The energy absorber of claim 4 wherein the two folds are along 45° angles relative to the length of the strip.

9. The energy absorber of claim 1 wherein each of the end portions has a fold adjacent the corresponding one of the first and second connector loops.

10. The energy absorber of claim 9 wherein each of the folds are along a 45° angle relative to the length of the strip.

11. The energy absorber of claim 10 wherein two of the end portions have an additional fold adjacent the corresponding one of the first and second connector loops.

12. The energy absorber of claim 11 wherein each of the additional folds are along a line parallel to the length of the strip.

13. The energy absorber of claim 1 wherein the tear apart connections are woven connections.

14. The energy absorber of claim 1 further comprising an inseparable connection joining the two layers together at a predetermined location in a portion of the strip extending between the two rolls.

15. The energy absorber of claim 14 wherein the inseparable connection extends perpendicular to the length over the full width of the strip.

16. The energy absorber of claim 1 wherein the connector loops are fixed to the end portions by stitching.

17. The energy absorber of claim 1 further comprising a swivel hoop extending through one of the connector loops to fix a snap hook to the strip.

18. The energy absorber of claim 1 further comprising an adhesive tape joining the two rolls together, the adhesive tape extending between the two rolls surrounding portions of the two rolls that are adjacent to each other.

19. The energy absorber of claim 1 further comprising a tube-shaped, flexible cover surrounding the two rolls, the tube-shaped cover having a pair of oppositely facing end openings, with one of the connector loops extending outwardly from one of the end openings and the other one of the connector loops extending outwardly from the other one of the end openings.

20. A cylindrically rolled energy absorber for use with fall protection equipment to absorb the energy of a user's fall from a worksite, the energy absorber comprising:
two parallel rolls defined by a strip of bi-layered webbing, the strip having a length extending between opposite ends of the strip and a width extending perpendicular to the length, the strip comprising two layers of webbing joined together over the length of the strip by tear-apart connections, the rolls centered on a longitudinal axis and spaced from each other along the longitudinal axis with the width of the strip in each roll extending parallel to the longitudinal axis, each end of the strip having end portions of each layer that are separated from each other; and
a pair of connector loops extending in opposite directions from the rolls, one of the loops extending from one of the rolls and the other loop extending from the other one of the rolls, each of the loops fixed to a different pair of the end portions, with each loop attached to an end portion from one end of the strip and an end portion from the other end of the strip.

* * * * *